(12) United States Patent
Fairbanks (10) Patent No.: US 7,831,810 B2
(45) Date of Patent: Nov. 9, 2010

(54) COMMUNICATING SIGNALS BETWEEN SEMICONDUCTOR CHIPS USING ROUND-ROBIN-COUPLED MICROPIPELINES

(75) Inventor: Scott M. Fairbanks, Corvallis, OR (US)

(73) Assignee: Oracle America, Inc., Redwood Shores, CA (US)

( * ) Notice: Subject to any disclaimer, the term of this patent is extended or adjusted under 35 U.S.C. 154(b) by 599 days.

(21) Appl. No.: 11/865,998

(22) Filed: Oct. 2, 2007

(65) Prior Publication Data

US 2009/0086768 A1    Apr. 2, 2009

(51) Int. Cl.
*G06F 9/00* (2006.01)
*G06F 15/00* (2006.01)

(52) U.S. Cl. .................. 712/220; 712/32; 712/200; 712/219; 712/18; 365/154

(58) Field of Classification Search .................. 326/93; 365/154; 712/18, 25, 220
See application file for complete search history.

(56) References Cited

U.S. PATENT DOCUMENTS

| | | | |
|---|---|---|---|
| 4,985,643 A | 1/1991 | Proebsting | |
| 6,580,303 B1* | 6/2003 | Harris et al. | 327/276 |
| 6,925,549 B2* | 8/2005 | Cook et al. | 712/25 |
| 2002/0078328 A1* | 6/2002 | Hofstee | 712/220 |

OTHER PUBLICATIONS

Efficient Fair Queuing Using Deficit Round-Robin by M.Shreedhar and George Varghese, Member, IEEE. IEEE/ACM Transaction on Networking, vol. 4, No. 3, Jun. 1996.*

R. Drost, R. D. Hopkins and I. Sutherland, Proximity Communication, IEEE Custom Integrated Circuits Conference, pp. 469-472, Sep. 2003.

S. Schuster, W. Reohr, P. Cook, D. Heidel, M. Immediato and K. Jenkins, Asynchronous Interlocked Pipelined CMOS Circuits Operating at 3.3-4.5GHz, IEEE Journal of Solid-State Circuits, pp. 292-293, Apr. 2000.

I. Sutherland and S. Fairbanks, GasP: A Minimal FIFO Control, Proc. Intern. Symp. on Advanced Research in Async. Circuits and Systems, pp. 46-53, IEEE Computer Society Press, Mar. 2001.

I. E. Sutherland, Micropipelines, Communications of the ACM, 32(6):720-738, Jun. 1989.

* cited by examiner

*Primary Examiner*—Vibol Tan
(74) *Attorney, Agent, or Firm*—Park, Vaughan, Fleming & Dowler LLP (57) ABSTRACT

Embodiments of the present invention provide a system for transferring data between a receiver chip and a transmitter chip. The system includes a set of data path circuits in the transmitter chip and a set of data path circuits in the receiver chip coupled to a shared data channel. In addition, the system includes a set of asynchronous control circuits for controlling corresponding data path circuits in the transmitter chip and receiver chip. Upon detecting the transition of a control signal for an asynchronous control circuit in the transmitter chip, the asynchronous control circuit is configured to enable a transfer of data from the corresponding data path circuit in the transmitter chip across the data channel to a corresponding data path circuit in the receiver chip, and generate a control signal to cause a next asynchronous control circuit to commence the transfer of a data signal.

16 Claims, 6 Drawing Sheets

COMMUNICATING SIGNALS BETWEEN SEMICONDUCTOR CHIPS USING ROUND-ROBIN-COUPLED MICROPIPELINES

BACKGROUND

1. Field of the Invention

Embodiments of the present invention relate to techniques for communicating signals between semiconductor chips. More specifically, embodiments of the present invention relate to techniques for communicating signals between semiconductor chips using round-robin-coupled micropipelines.

2. Related Art

Increases in the performance of semiconductor chips (such as microprocessors) have exceeded the ability of traditional communication channels (e.g., resistive wires) to achieve the off-chip communication bandwidths necessary to fully utilize on-chip computational resources. Consequently, computer system designers are beginning to design communication channels that enable significantly higher data transfer rates between semiconductor chips. For example, proximity communication techniques, which use capacitive signaling mechanisms, can achieve data transfer rates which are an order of magnitude higher than can be achieved by using traditional conductive communication techniques.

Unfortunately, data can often be transferred across these communication channels at a significantly higher rate than control signals can be generated to synchronize the data transfers. Consequently, the control circuitry can limit the performance of these communication channels.

Hence, what is needed is a system for communicating data between semiconductor chips without the above-described problem.

SUMMARY

Embodiments of the present invention provide a system for transferring data between semiconductor chips. The system includes: (1) a data channel coupled between an output node in a transmitter chip and an input node in a receiver chip; (2) a set of data path circuits in the transmitter chip coupled to the output node and a corresponding set of data path circuits in the receiver chip coupled to the input node, wherein each data path circuit in the transmitter chip transfers data to a corresponding data path circuit in the receiver chip across the data channel; and (3) a set of control channels coupled between a set of asynchronous control circuits in the transmitter chip and a set of corresponding asynchronous control circuits in the receiver chip, wherein each asynchronous control circuit controls data transfers for a separate data path circuit. Upon detecting the transition of a control signal for an asynchronous control circuit in the transmitter chip, the asynchronous control circuit is configured to enable a transfer of data from the corresponding data path circuit in the transmitter chip across the data channel to a corresponding data path circuit in the receiver chip, and generate a control signal to cause a next asynchronous control circuit to commence the transfer of a data signal.

In some embodiments, the asynchronous control circuits in the set of asynchronous control circuits in the transmitter chip operate in a round-robin sequence to enable sufficient data transfers from the data path circuits to keep the data channel from sitting idle.

In some embodiments, while enabling the transfer, the asynchronous control circuit in the transmitter chip is configured to send a signal to the corresponding asynchronous control circuit in the receiver chip requesting the capture of the data in the data channel. Upon receiving the signal, an asynchronous control circuit in the receiver chip is configured to immediately latch the data to protect the data from being overwritten by a subsequent data transfer.

In some embodiments, at least one of the data channel and the control channels is capacitively coupled.

In some embodiments, each asynchronous control circuit includes a set of separate C-elements that are separately coupled to at least one corresponding latch-controlling element. The C-elements communicate with one another to cause the corresponding latch-controlling element to forward and capture data at the proper times.

Embodiments of the present invention provide an electronic device for transferring data between semiconductor chips. The electronic device includes: (1) a power supply that provides electrical power to circuits in a transmitter chip and a receiver chip; (2) a data channel coupled between an output node in a transmitter chip and an input node in a receiver chip; (3) a set of data path circuits in the transmitter chip coupled to the output node and a corresponding set of data path circuits in the receiver chip coupled to the input node, wherein each data paths circuit in the transmitter chip transfers data to a corresponding data path circuit in the receiver chip across the data channel; and (4) a set of control channels coupled between a set of asynchronous control circuits in the transmitter chip and a set of corresponding asynchronous control circuits in the receiver chip, wherein each asynchronous control circuit controls data transfers for a separate data path circuit. Upon detecting a transition of a control signal for an asynchronous control circuit in the transmitter chip, the asynchronous control circuit is configured to enable a transfer of data from the corresponding data path circuit in the transmitter chip across the data channel to a corresponding data path circuit in the receiver chip and generate a control signal to cause a next asynchronous control circuit to commence the transfer of a data signal.

Embodiments of the present invention provide a transmitter chip that includes: (1) a set of data path circuits coupled to a shared output node, wherein each data path circuit includes one or more sequentially arranged latches; and (2) a control path for each data path circuit, wherein each control path includes a separate asynchronous control circuit coupled to each latch in the corresponding data path. The asynchronous control circuits in the control path in the transmitter chip use a micropipeline control protocol to control the transfer of a data signal through the one or more latches in a corresponding data path circuit to the output node. A control signal that enables the transfer of the data signal from a latch in the data path to the shared output node is also communicated to an asynchronous control circuit which controls a next data path to signal the asynchronous control circuit in the next data path to enable a data transfer from the latch in the next data path to the shared output node, wherein the data paths transfer data signals to the shared output node in a round-robin scheme.

Embodiments of the present invention provide a receiver chip. The receiver chip includes a set of data paths coupled to a shared input node. Each data path includes one or more sequentially arranged latches. The receiver chip also includes a control path for each data path that includes a separate asynchronous control circuit coupled to each latch in the data path. The asynchronous control circuits in the receiver chip use a micropipeline control protocol to control the transfer of a data signal between the latches in a corresponding data path. An asynchronous control circuit for a first latch in each data path in the receiver chip receives a control signal from a transmitter chip. A transition in the control signal from the transmitter chip causes the asynchronous control circuit to latch the data from the shared input node.

In some embodiments, the asynchronous control circuit for the first latch in each data path in the receiver chip is comprised of a post-charge logic device.

The foregoing sections describe the transfer of data across a single data channel. However, embodiments of the present invention include multiple data channels upon which data transfers are controlled using the same type of control path. For example, 32, 64, 128, or any number of data channels can be controlled by the control path using the techniques described above.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

In the following sections, the term "gate delay" refers to a measure of circuit path timing. Generally, a gate delay is the delay between the arrival of a signal at an input to a circuit and the eventual arrival of the signal at an output of the circuit, wherein the delay is caused by transistor gates in the circuit path.

Note that although we describe embodiments of the present invention which use a capacitive proximity communication channel, alternative embodiments can function with different types of communication channels, such as inductively coupled channels, optically coupled channels, solder balls, wired electrical connections, or other types of communication channels. In general, embodiments of the present invention can operate in any type of system which communicates between semiconductor chips.

Overview

Embodiments of the present invention provide a control protocol that significantly increases the rate of data transfers between semiconductor chips. These embodiments use a "micropipeline" control protocol to communicate control information for a set of high-data-rate data transfer paths between semiconductor chips. In these embodiments, each data transfer is controlled using single transitions in control signals.

Embodiments of the present invention provide a data channel that is coupled to a shared output node in a transmitter chip and to a shared input node in a receiver chip. In the transmitter chip, a set of data path circuits is coupled to the shared output node. In the receiver chip, a corresponding set of data path circuits is coupled to the shared input node. When transferring data across the channel to a corresponding receiver chip, the data path circuits place the data on the data channel in sequence using a round-robin scheme.

By using the multiple-control-path, round-robin scheme combined with the micropipeline control protocol, embodiments of the present invention can transfer data across the data channel at a significantly higher rate than conventional data transfer techniques.

Proximity Communication

Figure 1A:
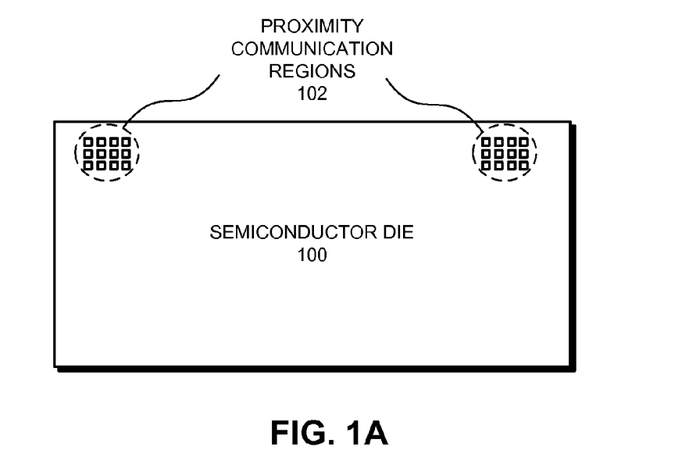
FIG. 1A illustrates a semiconductor die that includes proximity communication regions in accordance with embodiments of the present invention.

FIG. 1A illustrates a semiconductor die 100 that includes proximity communication regions 102 in accordance with embodiments of the present invention. Note that semiconductor die 100 may be packaged in a single-chip module (SCM) and/or a multi-chip module (MCM), wherein the MCM may include two or more SCMs. When packaged, semiconductor die 100 is sometimes referred to as a "chip."

In some embodiments, the proximity communication regions 102 may be on or proximate to at least one surface of the semiconductor die 100 (or the chip). In other embodiments, the semiconductor die 100 may be coupled to the proximity communication regions 102.

Figure 1B:
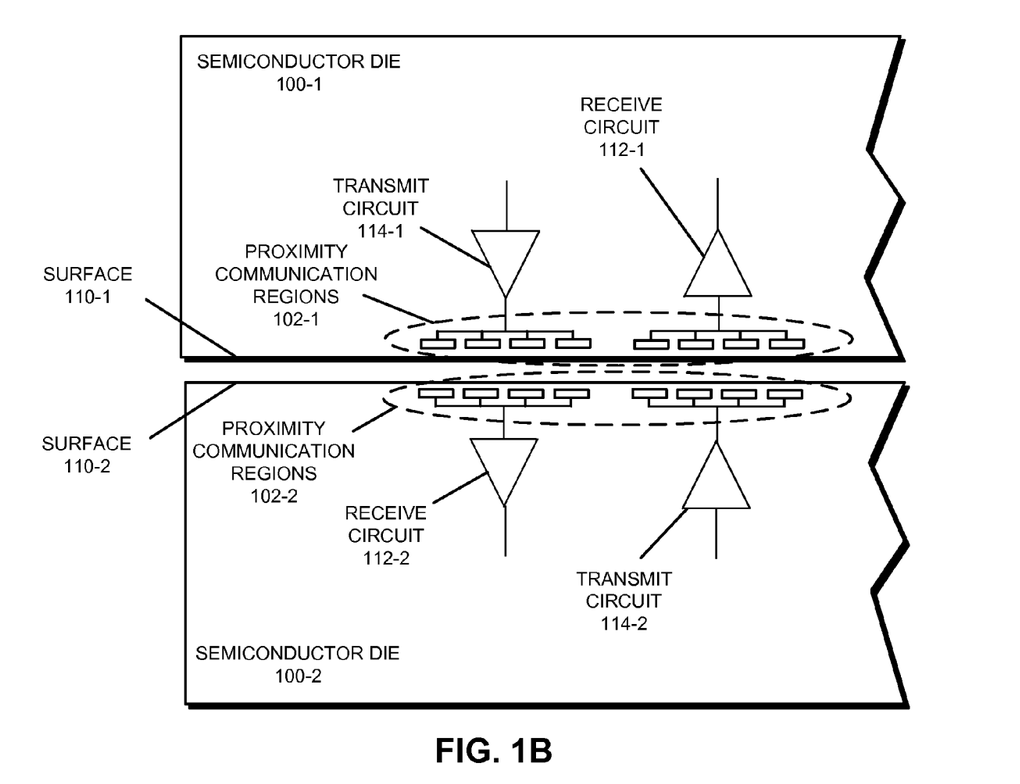
FIG. 1B illustrates semiconductor dies that communicate using proximity communication in accordance with embodiments of the present invention.

FIG. 1B illustrates semiconductor dies 100-1 and 100-2 that communicate using proximity communication in accordance with embodiments of the present invention. Semiconductor dies 100-1 and 100-2 can include proximity communication regions 102-1 and 102-2 that are located on or proximate to respective surfaces 110-1 and 110-2 of the semiconductor dies. For example, proximity communication regions 102-1 and 102-2 may be situated beneath protective layers so they reside below surfaces 110-1 and 110-2. Moreover, subsets of the proximity communication region 102-1 and 102-2 may be coupled to transmit circuits 114-1 and 114-2 (such as transmit drivers) and receive circuits 112-1 and 112-2.

A proximity communication channel includes a transmit circuit 114, at least a subset of the proximity communication region 102-1 and 102-2 on the adjacent semiconductor dies 100-1 and 100-2, respectively, and a receive circuit 112. For example, the communication channel may include transmit circuit 114-1, some of the proximity communication region 102-1 and 102-2, and receive circuit 112-2. Note that we call a bundle of one or more of these proximity communication channels a "proximity communication link."

The semiconductor dies can use the proximity communication link to communicate signals by capacitively coupling a signal from a transmit circuit 114-1 to a receive circuit 112-1. In this scheme, when a charge is placed on one proximity communication region, a response signal is created in the other proximity region. For example, transmit circuit 114-1 can drive a signal on to proximity communication region 102-1. The signal is then capacitively coupled on to proximity communication region 102-2; where the signal can be received by receive circuit 112-2.

Transmit circuits 114-1 and 114-2 and receive circuits 112-1 and 112-2 may use voltage-mode signaling (i.e., voltage-mode drivers and receivers). Furthermore, semiconductor dies 100 may also include wiring and electronics (not shown) to relay the data signals to additional circuitry on the semiconductor dies 100, such as logic, memory (for example, a packet buffer memory), I/O ports, demultiplexers, multiplexers, and switching elements.

Although we describe capacitively coupled proximity communication regions 102 for the purposes of illustration, some embodiments of the present invention use inductively coupled proximity communication regions, wherein data signals are communicated inductively between terminals on adjacent semiconductor dies 100. Other embodiments use optical proximity communication regions, wherein data signals are communicated optically between terminals on adjacent semiconductor dies 100.

Proximity communication potentially increases the communication bandwidth between separate semiconductor chips by more than an order of magnitude over conventional techniques that use traditional wire bonds. Three factors contribute to the increased bandwidth. First, communication channels can populate two dimensions instead of one. This factor potentially squares the amount of chip-to-chip throughput. Second, the area required for a proximity-capacitor plate is less than the area of a ball bond, allowing greater signal density. Finally the proximity of the two chips provides a shorter channel with less capacitance than a microstrip on a circuit board, allowing each channel to be driven at a higher throughput.

Electronic Device

Figure 2:
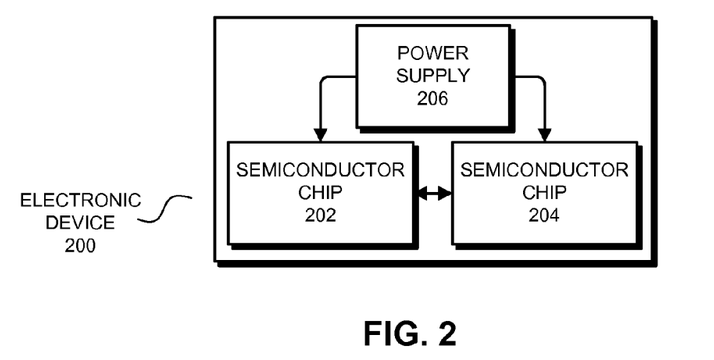
FIG. 2 presents a block diagram of an electronic device in accordance with embodiments of the present invention.

FIG. 2 presents a block diagram of electronic device 200 in accordance with embodiments of the present invention. Electronic device 200 can be any device that includes two or more semiconductor chips that communicate with each other. For example, electronic device 200 can be a cellular phone, a network device, a computer system, a server, a household appliance, a device controller, a media player, or another type of electronic device. Electronic device 200 includes semiconductor chips 202 and 204 that communicate with each other using data and control channels. Semiconductor chips 202 and 204 can generally include any type of semiconductor chip. For example, semiconductor chips 202 and 204 can be processors, logic chips, memory chips, bridge chips, analog chips, or another type of semiconductor chip.

In some embodiments of the present invention, one semiconductor chip (e.g., semiconductor chip 202) is a receiver chip, while the other is a transmitter chip. In alternative embodiments, the semiconductor chips are transceivers that include both transmitters and receivers.

Electronic device 200 also includes power supply 206 that provides power for semiconductor chips 202 and 204. Power supply 206 can be a battery, a DC converter coupled to an AC power source, or another source of power.

Micropipeline Control

Embodiments of the present invention provide a micropipeline control mechanism that uses single voltage transitions (i.e., rising or falling edges) of control signals to control data transfers between adjacent latches.

Note that although we describe embodiments of the present invention that use proximity communication, embodiments of the present invention can use other types of communication channels, such as inductively coupled channels, optically coupled channels, solder balls, wired electrical connections, or other types of communication channels.

Figure 3:
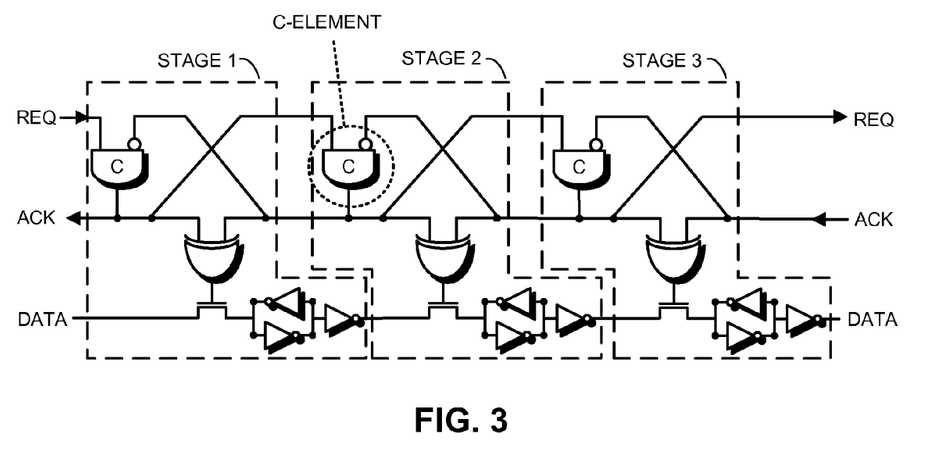
FIG. 3 presents a three-stage micropipeline that generates control signals for level-controlled latches in accordance with embodiments of the present invention.

FIG. 3 presents a three-stage micropipeline that generates control signals for level-controlled latches in accordance with embodiments of the present invention. In each stage, an XOR gate acts as a latch-controlling element, while the "C-elements" form a control path circuit for enabling the latch-controlling elements. One input of the XOR gate is coupled to the output of a first C-element in the same stage and the other input of the XOR gate is coupled to the output of a second C-element in the following stage. The micropipeline signaling protocol ensures that the inputs to the XOR are asserted alternately.

During operation, the stage 1 REQ signal transitions from a logical low ("LO") to a logical high ("HI"), which causes the output of the stage 1 C-element to transition to HI. In response, the output of the stage 1 XOR gate transitions to HI. The HI on the output of the stage 1 XOR gate activates the stage 1 NMOS device, making the stage 1 latch controlled by the stage 1 XOR gate transparent so that it copies the data forward (i.e., forwards the data to the back-to-back inverters which form the memory element in the stage 1 latch).

The HI on the output of the stage 1 XOR gate also causes the output of the stage 2 C-element to transition to a logical HI. This causes the stage 1 XOR gate to return to LO, which deactivates the stage 1 NMOS device, closing the stage 1 latch and capturing the data. At the same time, the output of the stage 2 XOR gate transitions to HI, making the stage 2 latch transparent so that it copies the data forward. In this way, data is moved forward between the micropipeline-controlled latch stages.

Control and Data Channels

In embodiments of the present invention, there exist two types of channels between the semiconductor chips: (1) a set of control channels and (2) a data channel. The control channels are used to communicate the signals that indicate when the data on the data channel can be latched. As described above, the signals on the control channels adhere to a micropipeline handshaking protocol. On the other hand, the information transferred across the data channel is level-encoded. In some embodiments of the present invention, the control and/or data channel signals are differential.

Assuming that the skew between the bits of the data word can be managed to satisfy a bundling constraint (i.e., a constraint on the temporal proximity of arriving bits), embodiments of the present invention are not limited in the number of bits in the data word transferred across the data channel. In other words, the micropipeline control delivers synchronization information that can be used to transfer data words that include one bit, 64 bits, 1000 bits, or any other number of bits.

In embodiments of the present invention, the data transfer rate (i.e., the rate at which the receiver can resolve and latch new data signals that have been transferred across the data channel) is significantly higher than the rate at which a control circuit can generate a control signal for synchronizing the data transfer. For example, in some embodiments, the circuits on each of the control channels can generate a new control signal every six gate delays, while the data latches can latch new data bits communicated across the proximity interface in less than two gate delays. Hence, in some embodiments of the present invention, multiple control signals are multiplexed to control data transfers across a single data channel. In these embodiments, the multiplexed control signals can deliver control signals at the data transfer rate.

For example, in some embodiments of the present invention, three control signal circuits with six-gate-delay timing can be combined in sequence to facilitate sending a control signal for synchronizing a data transfer every two gate delays. For example, control circuit 0 can assert a control signal at time 0 and then again each 6 gate delays, while control circuit 1 can assert a control signal at time 2 and then again each 6 gate delays, and control circuit 2 can assert a control signal at time 4 and then again each 6 gate delays.

In alternative embodiments, other sequences can be used. For example, two control circuits that can generate a control signal every 6 gate delays can be combined to transfer data every 3 gate delays.

Latching a data signal every two gate delays involves using a specialized latching circuit. Such circuits are known in the art, hence a more detailed description is not provided.

Embodiments of the present invention can use an "open-loop" asynchronous design. An open-loop asynchronous design does not require the receiver to communicate an "acknowledge" signal to the transmitter when the data is latched, which means that there is no need to detect and amplify an acknowledge signal.

In embodiments of the present invention, in order to achieve high data transfer rates, three separate control channels operate concurrently. The alternating order with which the control signals are generated is enforced by a round-robin scheme as described below.

Figure 4:
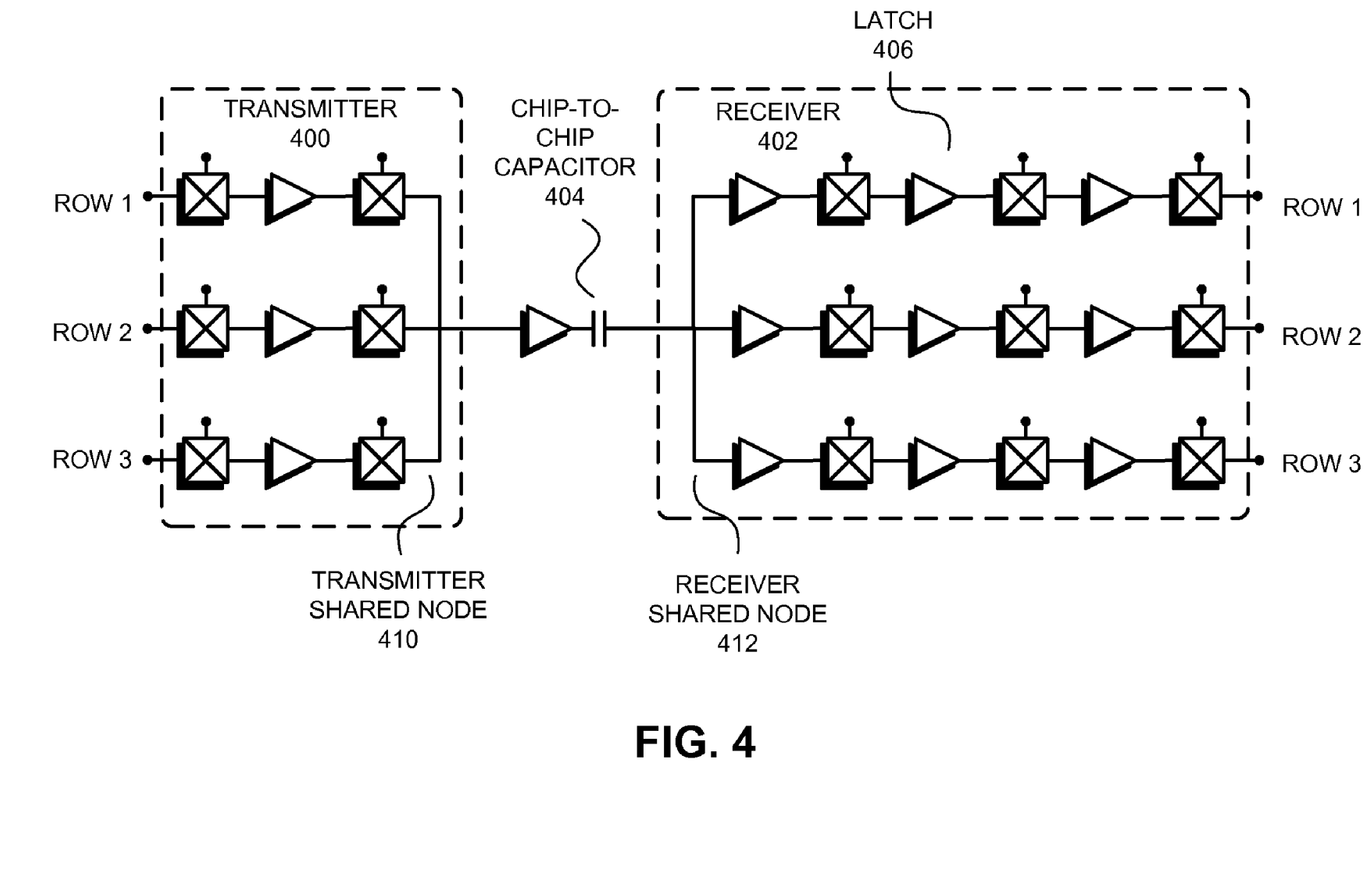
FIG. 4 presents a circuit diagram illustrating data paths in a transmitter and a receiver accordance with embodiments of the present invention.

Assuming nominal coupling capacitance (e.g., enough coupling capacitance that 10% of the signal at the output of the amplifier that drives chip-to-chip capacitor 404 is seen at receiver shared node 412) on the proximity communication channels, embodiments of the present invention provide an asynchronous design that can generate (and transfer) a control signal for synchronizing a data transfer every 2 gate delays. Should the chips bow or expand in a manner that pulls them apart, the coupling capacitance can be diminished, thereby disrupting the ability of the system to transfer data and control signals across the proximity communication channel every two gate delays. However, the asynchronous design allows the system to adapt to the new signal transfer timing.

Circuits

FIG. 4 presents a circuit diagram illustrating data paths in a transmitter 400 and a receiver 402 accordance with embodiments of the present invention. Transmitter 400 and receiver 402 are capacitively coupled to each other through chip-to-chip capacitor 404. Each row in transmitter 400 and receiver 402 forms a separate data path that includes a number of latches 406 coupled together in sequence. For example, row 1 in transmitter 400 and row 1 in receiver 402 form one data path. Latches 406 store the signal in each stage of the data path.

Note that although we describe data paths with latches, in alternative embodiments of the present invention the data paths can include additional circuitry, such as logic circuits, memory circuits, control circuits, and/or other circuitry.

During operation, the data path circuits in rows 1, 2, and 3 in transmitter 400 alternately place data on transmitter shared node 410. The data from transmitter shared node 410 is driven on to the transmitter-side plate of chip-to-chip capacitor 404. The signal from the transmitter-side plate is capacitively coupled to the receiver-side plate and from the receiver-side plate to receiver shared node 412 in receiver 402. The data is then latched from receiver shared node 412 by circuit elements in the corresponding data path in receiver 402.

Figure 5:
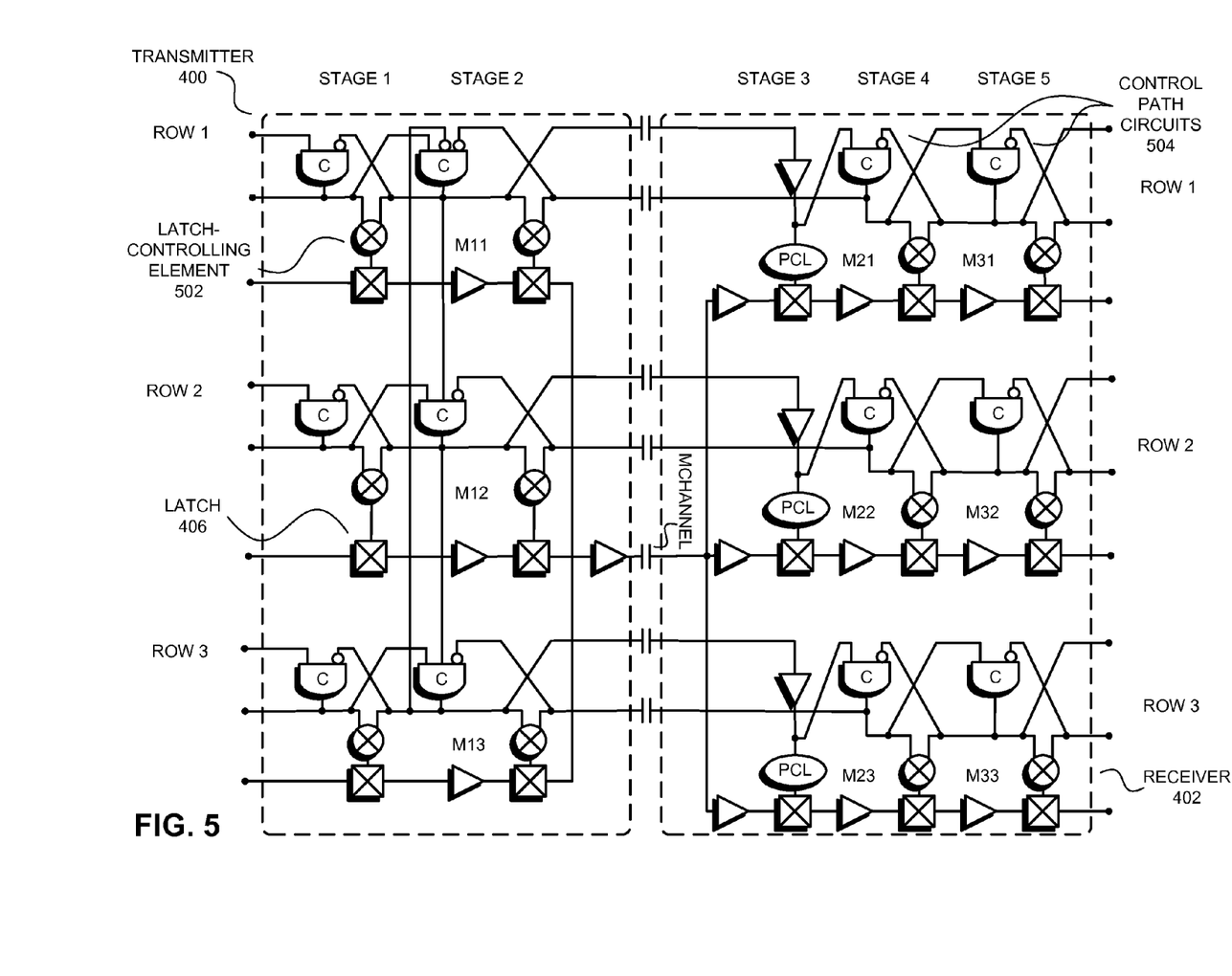
FIG. 5 presents a circuit diagram illustrating data paths and control circuits for the data paths in a transmitter and a receiver in accordance with embodiments of the present invention.

FIG. 5 presents a circuit diagram illustrating data paths and corresponding control circuits for the data paths in transmitter 400 and receiver 402 in accordance with embodiments of the present invention. The circuit elements in the data path circuit are similar to the elements in the data path circuit in FIG. 4. Hence, each data path includes a set of latches 406 coupled sequentially. In addition, the control circuit is similar to the control circuit shown in FIG. 3. As was shown in FIG. 3, the control circuit includes latch-controlling elements 502 (i.e., XOR gates, which are represented in FIG. 5 by a circle that includes two crossed lines) and control path circuits 504.

The circuit diagram in FIG. 5 is divided into a number of vertical "stages," with each stage including a data storage location (i.e., a latch 406) for each row and separate control circuits for controlling the stage's latches 406. The stages are labeled "stage 1"-"stage 5," while the rows are labeled "row 1"-"row 3." In addition, each data storage location is labeled "M[1-3][1-3]." The special "data storage location" (i.e., coupling capacitor 404) in the channel is labeled "$M_{channel}$."

In embodiments of the present invention, the latch-controlling element 502 in stage 3 is a post-charge logic buffer (PCL). The PCL buffer produces an output pulse of three gate delays whenever a transition, whether rising or falling, is received on its input. PCL buffers are known in the art and are therefore not described in more detail.

Note that with respect to data signals transferred through the rows, each row can be considered to be a separate first-in-first-out queue ("FIFO"). For example, in transmitter 400, data proceeds from the input of a given row through the latch in each stage and to the output (data channel) in first-in-first-out order.

The C-elements in stages 1, 4, and 5 of each row have two inputs. These C-elements receive control signals from previous and subsequent C-elements in the same row indicating when a data transfer should be performed. For example, the C-element in stage 4, row 1, includes an input driven by the output of the amplifier in stage 3, row 1 as well as the output of the C-element in stage 5, row 1. When the output of the amplifier in stage 3 is asserted, it causes the C-element in stage 4 to make the corresponding latch transparent to permit data to be driven to memory location M31. On the other hand, when the output of the C-element in stage 5 is asserted, it causes the C-element in stage 4 to close the latch, capturing the data in M31.

The control circuit in each row interacts with the control circuits in the other rows to enforce each FIFO separately placing data in the data channel in sequence. The C-elements in stages 2 and 4 of each row can use a modified handshake protocol to place data from the corresponding FIFO into the data channel in the correct order. In order to enable the handshake, the C-elements in stage 2 of each row have three inputs. For example, in stage 2, row 1, the first input is from the previous C-element in stage 1 of the same row; the second input is from the C-element in stage 2, row 3; and the third input is an acknowledge signal from the C-element in stage 4, row 1 on the opposite side of the capacitive interface.

The C-elements in stage 2 do not use a typical handshake protocol when communicating with the other C-elements in stage 2 (i.e., in the other rows of transmitter 400). Instead, the C-elements communicate control signals with one another using a "round-robin" protocol. Hence, the signal that each C-element in stage 2 asserts to enable a data transfer is also forwarded to the C-element in the next row, thereby causing the C-element in the next row to enable the subsequent data transfer. The round-robin protocol allows multiple FIFOs to write data onto the transmitter shared node 410 in sequence, but prevents multiple FIFOs from writing their data onto shared node 410 at the same time.

Because the data channel is shared between multiple data paths, a transfer from another data path can potentially over-write data destined for one data path if the data is not properly captured in receiver 402. Hence, in some embodiments of the present invention, the control circuit (i.e., amplifier) that controls the latch in stage 3 causes the latch to capture the data as soon as a request signal is detected, which ensures that data is written into storage location M3[1-3] before latching new data into location M2[1-3]. That is, the data is latched in row 1 of the receiver before a data transfer in row 2 overwrites the value in the data channel.

Capturing the data as soon as the request signal is detected prevents data corruption when data is not captured in a downstream latch in the following way. First assume that the C-element at stage 2, row 1 enables the latch that places the data held in M11 onto the data channel. The stage 2 C-element also forwards the enable signal to the stage 3, row 1 amplifier (as a "request" signal). The stage 3 amplifier detects the request from stage 2, and enables the stage 3 latch, writing the data into M21. The stage 3 amplifier also forwards the request to the stage 4, row 1 C-element. The C-element in stage 4 detects the request from stage 3, and enables the stage 4 latch, thereby writing the data into M31. The stage 4 C-element also forwards the request to the stage 5 C-element. Next, assume that the stage 5 C-element fails to "acknowledge" the request from stage 4 (i.e., the output of the stage 5 C-element is not activated in response to the request signal from stage 4). The next time that the stage 2, row 1 C-element sends a request, the data is unconditionally latched by the stage 3 amplifier into M21 from the data channel. Storage location M22 is then written from stage 2, row 2 (thereby overwriting the value in the data channel). Because stage 5 is not activated, the stage 4, row 1 C-element does not assert the acknowledge signal to stage 2's C-element to acknowledge the receipt of data held in M21. Hence, the next time that the C-element at stage 2, row 1 is enabled (via the round-robin control), the stage 2, row 1 C-element does not write data onto the data channel and the round-robin control stalls until the data held up downstream from the C-element in stage 4, row 1 is acknowledged. If the stage 3, row 1 amplifier did not automatically latch the data, the data could be overwritten by the subsequent data transfer from stage 2, row 2.

Circuit Implementations

Some embodiments of the present invention are implemented using differential signaling, which can yield significantly more signal strength coupled across the interface. Higher signal strength in turn provides better noise immunity.

C-Element

Figure 6:
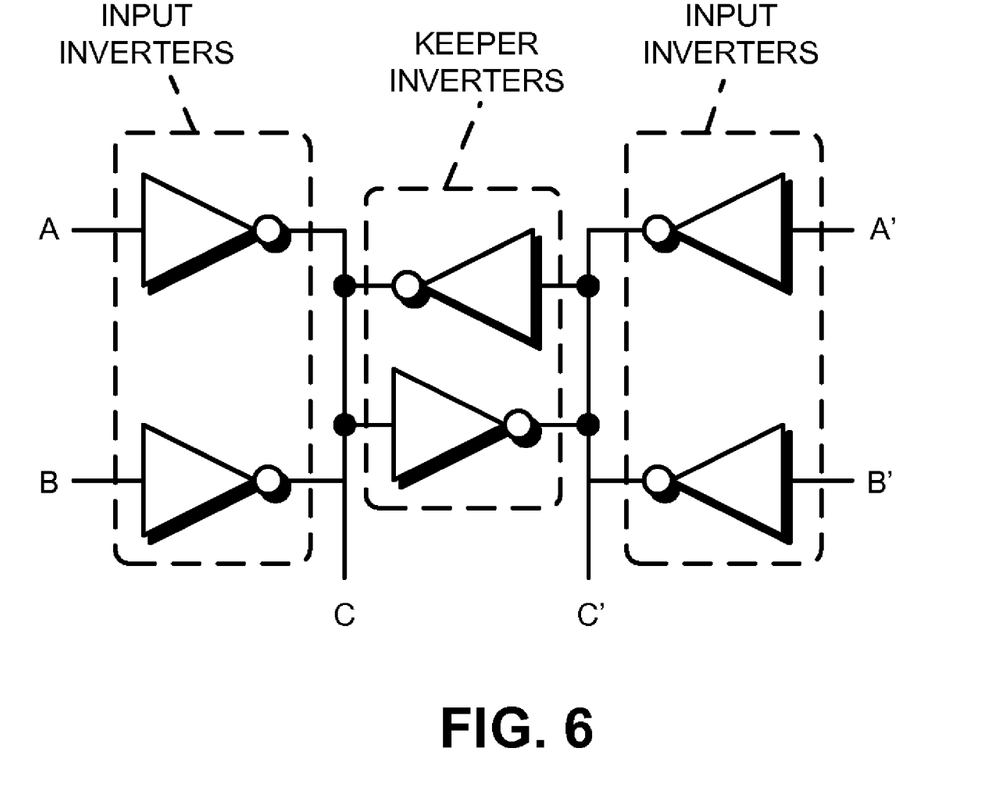
FIG. 6 presents an analog C-element in accordance with embodiments of the present invention.

FIG. 6 presents a diagram of an analog C-element in accordance with embodiments of the present invention. Although drawing static power when inputs A and B differ, the C-element suffers very little delay in producing an output for a given input combination.

Recall that the C-element that sends a request signal across the control channel (i.e., the stage 2 C-element in FIG. 5) communicates with three other C-elements. In some embodiments of the present invention, the three-input C-element is constructed from two two-input C-elements. In these embodiments, the inputs from C-elements that are likely to arrive earlier are coupled to a first C-element. The output of the first C-element is coupled to one of the inputs of the second C-element. The second C-element's other input is coupled to the round-robin control loop between the C-elements in stage 2, 3, and 4.

Data Transfer Process

Figure 7:
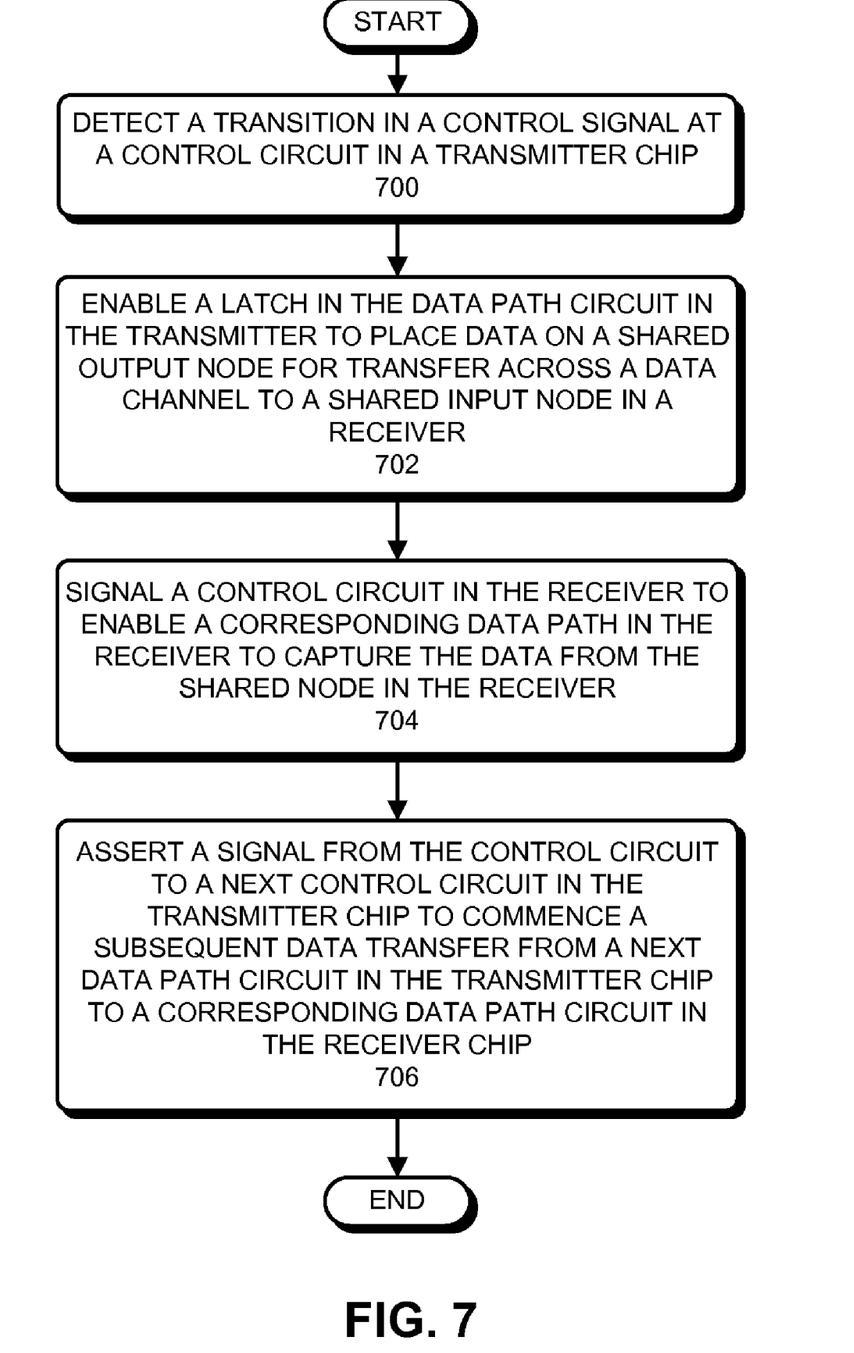
FIG. 7 presents a flowchart illustrating a data transfer process in accordance with embodiments of the present invention.

FIG. 7 presents a flowchart illustrating a data transfer process in accordance with embodiments of the present invention. For the purposes of illustration, we describe the transfer process with respect to the control circuit in stage 2, row 1 of FIG. 5.

The process starts when a control circuit in a transmitter chip detects a transition in a control signal (step 700). The control signal can be a data-forwarding signal received from the previous control circuit in stage 1, row 1 or a round-robin signal received from the control signal stage 2, row 3. The control circuit commences a transfer in response to a change in state (i.e., a transition) of the control signal and does not rely on the level of the control signal.

The control circuit then enables a latch in the data path in the transmitter to place data on a shared output node for transfer across a data channel to a shared input node in a receiver (step 702). From the shared output node, the data signal is buffered and driven onto a transmitter-side plate of a chip-to-chip capacitor 404. The signal is capacitively coupled from the transmitter-side plate to the receiver-side plate and, from there, charges (or discharges, depending on the logical state of the data signal) the shared input node in the receiver.

Next, the control circuit signals a control circuit in the receiver to enable a corresponding data path in the receiver to capture the data from the shared node in the receiver (step 704). In embodiments of the present invention, the control circuit in the receiver immediately captures the data from the shared input node. Immediately capturing the data prevents a subsequent data transfer from overwriting the data before the data can be latched in the receiver.

The control circuit then asserts a signal to a next control circuit in the transmitter chip to commence a subsequent data transfer from a next data path circuit in the transmitter chip to a corresponding data path circuit in the receiver chip (step 706). The signal to the next control circuit is the "round-robin" signal that synchronizes the placement of data on the shared output and input nodes of the transmitter and receiver.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus for transferring data between semiconductor chips, comprising:
    a data channel coupled between an output node in a transmitter chip and an input node in a receiver chip;
    a set of data path circuits in the transmitter chip coupled to the output node and a corresponding set of data path circuits in the receiver chip coupled to the input node, wherein each data path circuit in the transmitter chip transfers data to a corresponding data path circuit in the receiver chip across the data channel; and
    a set of control channels coupled between a set of asynchronous control circuits in the transmitter chip and a set of corresponding asynchronous control circuits in the receiver chip, wherein each asynchronous control circuit controls data transfers for a separate data path circuit;
    wherein, upon detecting a transition of a control signal for an asynchronous control circuit in the transmitter chip, the asynchronous control circuit is configured to:
    enable a transfer of data from the corresponding data path circuit in the transmitter chip across the data channel to a corresponding data path circuit in the receiver chip, and generate a control signal to cause a next asynchronous control circuit to commence a data transfer.

2. The apparatus of claim 1, wherein the set of asynchronous control circuits in the transmitter chip is configured to operate in a round-robin sequence.

3. The apparatus of claim 1, wherein while enabling the transfer, the asynchronous control circuit in the transmitter chip is configured to send a signal to the corresponding asynchronous control circuit in the receiver chip requesting the capture of the data in the data channel; and upon receiving the signal, an asynchronous control circuit in the receiver chip is configured to immediately latch the data to protect the data from being overwritten by a subsequent data transfer.

4. The apparatus of claim 1, wherein at least one of the data channel and the control channels are capacitively coupled.

5. The apparatus of claim 1, wherein each asynchronous control circuit includes a set of separate C-elements that are separately coupled to at least one corresponding latch-controlling element and wherein the C-elements communicate with one another to cause the corresponding latch-controlling element to forward and capture data at the proper times.

6. An electronic device for transferring data between semiconductor chips, comprising:

a power supply that provides electrical power to circuits in a transmitter chip and a receiver chip;

a data channel coupled between an output node in the transmitter chip and an input node in the receiver chip;

a set of data path circuits in the transmitter chip coupled to the output node and a corresponding set of data path circuits in the receiver chip coupled to the input node, wherein each data path circuit in the transmitter chip transfers data to a corresponding data path circuit in the receiver chip across the data channel; and a set of control channels coupled between a set of asynchronous control circuits in the transmitter chip and a set of corresponding asynchronous control circuits in the receiver chip, wherein each asynchronous control circuit controls data transfers for a separate data path circuit;

wherein, upon detecting a transition of a control signal for an asynchronous control circuit in the transmitter chip, the asynchronous control circuit is configured to:

enable a transfer of data from the corresponding data path circuit in the transmitter chip across the data channel to a corresponding data path circuit in the receiver chip, and generate a control signal to cause a next asynchronous control circuit to commence a data transfer.

7. The electronic device of claim 6, wherein the set of asynchronous control circuits in the transmitter chip is configured to operate in a round-robin sequence.

8. The electronic device of claim 6, wherein while enabling the transfer, the asynchronous control circuit in the transmitter chip is configured to send a signal to the corresponding asynchronous control circuit in the receiver chip requesting the capture of the data in the data channel; and upon receiving the signal, an asynchronous control circuit in the receiver chip is configured to immediately latch the data to protect the data from being overwritten by a subsequent data transfer.

9. The electronic device of claim 6, wherein at least one of the data channel and the control channels are capacitively coupled.

10. The electronic device of claim 6, wherein each asynchronous control circuit includes a set of separate C-elements that are separately coupled to at least one corresponding latch-controlling element and wherein the C-elements communicate with one another to cause the corresponding latch-controlling element to forward and capture data at the proper times.

11. A method for transferring data between a transmitter chip and a receiver chip, comprising:

upon detecting a transition in a control signal at an asynchronous control circuit in the transmitter chip, signaling a data path circuit in the transmitter chip and an asynchronous control circuit in the receiver chip to transfer data from the data path circuit in the transmitter chip to a corresponding data path circuit in the receiver chip, wherein transferring the data involves enabling a latch in the data path circuit in the transmitter chip to place data on a shared output node in the transmitter chip, wherein the data is communicated from the shared output node across a data channel and to a shared input node in the receiver chip; and signaling an asynchronous control circuit in the receiver chip to enable a corresponding data path that is coupled to the shared input node in the receiver chip to capture the data; and asserting a signal from the asynchronous control circuit to a next asynchronous control circuit in the transmitter chip to commence a subsequent data transfer from a next data path circuit in the transmitter chip to a corresponding data path circuit in the receiver chip;

wherein the asynchronous control circuits in the transmitter chip commence data transfers in a round-robin sequence.

12. A transmitter chip, comprising:

a set of data path circuits coupled to a shared output node, wherein each data path circuit includes one or more latches communicating data sequentially; and a control path for each data path circuit, wherein each control path includes a separate asynchronous control circuit coupled to each latch in a corresponding data path circuit;

wherein the asynchronous control circuits use a micropipeline control protocol to control a transfer of a data signal through the one or more latches in the corresponding data path circuit to the shared output node; and wherein a control signal that enables the transfer of the data signal from a latch in the data path circuit to the shared output node is also communicated to an asynchronous control circuit which controls a next data path to signal the asynchronous control circuit in the next data path to enable a data transfer from the latch in the next data path to the shared output node, wherein the data paths transfer data signals to the shared output node in a round-robin fashion.

13. The transmitter chip of claim 12, further comprising an output buffer coupled between the shared output node and a data channel that drives a signal from the shared output node across the data channel to a receiver chip that is coupled to the data channel; and wherein the control signal that enables the transfer from the latch in the data path to the shared output node is communicated to a receiving chip through a control channel, wherein the control signal causes a corresponding data path in the receiver chip to receive the data signal.

14. The transmitter chip of claim 12, wherein each asynchronous control circuit includes a set of separate C-elements that are each coupled to at least one corresponding latch-controlling element, and wherein the C-elements cause the at least one latch-controlling element to forward and capture data at the proper times.

15. A receiver chip, comprising:

a set of data paths coupled to a shared input node, wherein each data path includes one or more sequentially arranged latches; and a control path for each data path, wherein each control path includes a separate asynchronous control circuit coupled to each latch in a corresponding data path;

wherein the asynchronous control circuits use a micropipeline control protocol to control a transfer of a data signal between the latches in the corresponding data path; and wherein an asynchronous control circuit for a first latch in each data path receives a control signal from a transmitter chip, wherein a transition in the control signal from the transmitter chip causes the asynchronous control circuit to immediately latch the data to protect the data from being overwritten by a subsequent data transfer.

16. The receiver chip of claim 15, wherein the asynchronous control circuit for the first latch in each data path is comprised of a post-charge logic device.

* * * * *